United States Patent Office 3,463,635
Patented Aug. 26, 1969

3,463,635
RECOVERY OF MERCURY FROM NUCLEAR FUEL REPROCESSING WASTES
Donald W. Rhodes and Malcolm W. Wilding, Idaho Falls, Idaho, assignors to the United States of America as represented by the United States Atomic Energy Commission
No Drawing. Filed Nov. 1, 1967, Ser. No. 679,668
Int. Cl. C22b 43/00, 7/00; G21f 9/04
U.S. Cl. 75—121                       2 Claims

ABSTRACT OF THE DISCLOSURE

A process for recovering mercury metal, present in acidic aqueous solutions as the mercuric ion, by adding hydrazine hydrate to the solution and refluxing the solution until the mercuric ion is reduced to mercury metal.

CONTRACTUAL ORIGIN OF THE INVENTION

This invention described herein was made in the course of, or under, a contract with the United States Atomic Energy Commission.

BACKGROUND OF THE INVENTION

This invention relates to a method of recovering mercury metal from acidic solutions. More specifically, this invention relates to a method of recovering mercury metal from acidic nuclear fuel reprocessing waste solutions where it is present as the mercuric ion.

Important to processing of irradiated nuclear reactor fuels is the disposition of the radioactive reprocessing waste solutions. Many of these fuel reprocessing waste solutions are calcined or heated to a high temperature to drive off the moisture and concentrate the remaining material into a solid suitable for storage for long periods of time until the radioactivity reaches more tolerable levels.

Many of these reprocessing waste solutions contain mercuric ion, generally present as mercuric nitrate. The mercury is a catalyst added to the nitric acid solution to promote dissolution of aluminum fuel cladding. During calcination, in which temperatures may exceed 500° C., the mercury present in the waste solution is volatilized and subsequently contaminates the off-gas cleaning equipment. This necessitates periodic cleaning and decontamination of the equipment at considerable expense.

Additionally, this results in the loss of valuable mercury metal which could otherwise be reclaimed and reused at a substantial saving in cost.

Efforts by others to develop a method to recover the mercury present in these solutions resulted in a method whereby the solution was allowed to seep through a metal or glass column packed with either copper shot or aluminum turnings. Although the method was successful in removing the mercury from the solution by formation of an amalgam, the high concentrations of acid present in most waste reprocessing solutions attacked the aluminum and copper and the resulting gas made the columns practically inoperable. The cost of processing the amalgam to recover the mercury also makes the method economically unattractive.

SUMMARY OF THE INVENTION

We have invented a process for recovering mercury from acidic solutions which eliminates the difficulties described above, and yet permits recovery of more than 99% of the mercury present in the solution. The process of this invention involves adding a small amount of hydrazine hydrate to the acidic solution containing the mercuric ion. The solution is then heated to refluxing temperature and the mercuric ion digested for a period of time until the mercury can be recovered as the pure metal.

It is therefore one object of this invention to provide a method for removing mercury from acidic solutions.

It is another object of this invention to provide a method of recovering mercury from acidic solutions.

It is still another object of this invention to provide an economical method of recovering relatively pure mercury metal from acidic aqueous nuclear fuel reprocessing solutions.

DESCRIPTION OF THE PREFERRED EMBODIMENT

These and other objects of this invention can be attained by the addition of about 0.63% by weight of hydrazine hydrate to the acidic solution, after which the solution is heated to refluxing temperature and refluxed for a period of time sufficient to digest the mercuric ion present in the solution and quantitatively reduce it to mercury metal. After reduction is complete, the mercury is removed from the acidic solution which can then be further processed or disposed of without any problem of equipment contamination with mercury.

The exact amount of hydrazine hydrate necessary to accomplish reduction of the mercuric ion to metallic mercury has not been determined. Experimentation showed that 0.63% by weight of solution containing the mercuric ion was sufficient to obtain a quantitative reduction of the mercuric ion present. A lesser amount of hydrazine might be sufficient to promote mercuric ion reduction while increasing the amount of hydrazine would only add to the cost of recovery.

The time required to digest the mercuric ion and reduce it to the metallic state is dependent upon the composition of the solution being processed. In general, it was found that a reflux time of at least three hours was sufficient to recover greater than 99% of the mercury present in the solution.

The reduced mercury can be collected by either decanting the waste solution from the container, leaving the mercury remaining on the bottom, or by collecting the mercury in a depression in the bottom of the reflux container and drawing it off of the bottom.

The following example is given as an illustration of the process of this invention and is not to be taken as limiting the scope or extent of the invention.

Example 100 ml. of a synthetic waste solution was made up containing 1.0 M $HNO_3$, 1.6 M $Al(NO_3)_3 \cdot 9H_2O$, 0.02 M $Hg(NO_3)_2 \cdot H_2O$ and 0.09 M $NaNO_3$.

0.75 ml. of 85% hydrazine hydrate solution was added to the waste solution. The resulting solution was then refluxed at 103° C. for three hours. At the end of this period, the mercury had collected as a bright shiny deposit on the bottom of the digestion flask. The supernatant liquid was tested and found to contain less than $3 \times 10^{-5}$ M mercuric nitrate which was the detection limit for the analytical method used.

It is to be understood that the invention is not to be limited by the details given herein but that it may be modified within the scope of the appended claims.

The embodiments of the invention in which an exclusive property or privilege is claimed are defined as follows:

1. A process for the recovery of mercury from an acidic aqueous solution containing mercuric ions comprising: adding at least 0.63% by weight hydrazine hydrate to said solution, heating said solution to refluxing temperature and maintaining said temperature for at least three hours whereby said mercury ions present are reduced to metallic mercury.

2. The process of claim 1 wherein the acidic aqueous solution is a solution of nitric acid.

References Cited

UNITED STATES PATENTS 2,787,540  4/1957  Appell _____ 75—121

OSCAR R. VERTIZ, Primary Examiner

HOKE S. MILLER, Assistant Examiner